United States Patent
Dosho

(10) Patent No.: US 11,010,148 B2
(45) Date of Patent: May 18, 2021

(54) APPLICATION INSTALLATION DEVICE AND APPLICATION INSTALLATION METHOD

(71) Applicant: DENSO CORPORATION, Kariya (JP)

(72) Inventor: Hiroyuki Dosho, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 16/792,438

(22) Filed: Feb. 17, 2020

(65) Prior Publication Data

US 2020/0310772 A1 Oct. 1, 2020

(30) Foreign Application Priority Data

Mar. 27, 2019 (JP) .............................. JP2019-060220

(51) Int. Cl.
*G06F 9/44* (2018.01)
*G06F 8/61* (2018.01)
*B60W 50/04* (2006.01)
*B60W 50/00* (2006.01)

(52) U.S. Cl.
CPC .............. *G06F 8/61* (2013.01); *B60W 50/045* (2013.01); *B60W 2050/0082* (2013.01)

(58) Field of Classification Search
None
See application file for complete search history.

(56) References Cited

U.S. PATENT DOCUMENTS

| | | | |
|---|---|---|---|
| 8,589,018 B2* | 11/2013 | Sarnacke | B60R 25/00 |
| | | | 701/29.2 |
| 9,020,695 B2* | 4/2015 | Nagai | G06F 17/00 |
| | | | 701/36 |
| 10,019,582 B1* | 7/2018 | Mao | H04L 12/1435 |
| 10,216,551 B1* | 2/2019 | Jha | G06F 16/00 |
| 10,372,434 B1* | 8/2019 | Michel | G06F 8/65 |
| 2013/0159995 A1* | 6/2013 | Senot | G06F 8/60 |
| | | | 717/178 |
| 2015/0074687 A1* | 3/2015 | Ji | G06F 9/543 |
| | | | 719/318 |
| 2016/0239286 A1* | 8/2016 | Tanaka | H04L 67/34 |

FOREIGN PATENT DOCUMENTS

JP  2015-176504 A  10/2015

* cited by examiner

*Primary Examiner* — Qamrun Nahar
(74) *Attorney, Agent, or Firm* — Posz Law Group, PLC

(57) ABSTRACT

An application installation device, which is connected to a plurality of electronic control units, receives (i) a first application to be installed and (ii) application usage information indicating a second application used by the first application, while storing existing application information indicating an existing application installed in each of the plurality of electronic control units. In response to determining that the second application is included as the existing application based on the existing application information, a determined electronic control unit in which the first application and the second application are enabled to be installed is determined as an installation destination of the first application among the plurality of electronic control units. The first application is transmitted to the determined electronic control unit.

10 Claims, 12 Drawing Sheets

| APPLI | USED APPLI | PROVIDED SERVICE |
|---|---|---|
| APPLI A | APPLI B | SERVICE P |

APPLICATION INSTALLATION DEVICE AND APPLICATION INSTALLATION METHOD

CROSS REFERENCE TO RELATED APPLICATION

The present application is based on Japanese Patent Application No. 2019-60220 filed on Mar. 27, 2019, the disclosure of which is incorporated herein by reference.

TECHNICAL FIELD

The present disclosure relates to an application installation device that mainly installs an application in a vehicle electronic control unit, and an application installation method executed for the application installation device.

BACKGROUND

Nowadays some vehicle has more than 100 electronic control units (ECUs), which play the brain of various advanced technologies. Various functions are newly installed in the ECU, so that the functions of the ECU can be further expanded.

There is known an information processing device that executes installation of a program. In particular, such an information processing device performs the followings: calculating used amounts in capacity of several storage media; determining whether a installation target program can be installed by comparing the calculated used amount with the free data capacity of each recording medium; and executing the program installation on a storage medium determined to be installable among a plurality of storage media.

SUMMARY

According to an example of the present disclosure, an application installation device may be provided to be connected to a plurality of electronic control units. The application installation device may receive (i) a first application to be installed and (ii) application usage information indicating a second application used by the first application, while storing existing application information indicating an existing application installed in each of the plurality of electronic control units. In response to determining that the second application is included as the existing application based on the existing application information, a determined electronic control unit in which the first application and the second application are enabled to be installed may be determined as an installation destination of the first application among the plurality of electronic control units. The first application may be transmitted to the determined electronic control unit.

BRIEF DESCRIPTION OF DRAWINGS

The objects, features, and advantages of the present disclosure will become more apparent from the following detailed description made with reference to the accompanying drawings. In the drawings.

DETAILED DESCRIPTION

Embodiments of the present disclosure will be described below with reference to the drawings. The configuration disclosed in each of a plurality of embodiments is not closed only in each embodiment, but can be combined across the embodiments. For example, the configuration disclosed in one embodiment may be combined with the configuration in another embodiment. Further, the configurations disclosed in the respective embodiments may be collected and combined.

(Premise Common to Each Embodiment)

Each of the following embodiments will be mainly described with examples of (i) an in-vehicle electronic control unit mounted on a vehicle such as an automobile and (ii) an application installation device for a vehicle. The present disclosure however also includes devices for other than in-vehicle use or vehicular use.

The premise of each embodiment is as follows. An application to be installed (i.e., an install-target application) is referred to as an application A. Since the application A uses an application B, the application B is required for execution of the application A. The application B has already been installed in an ECU 1 among a plurality of electronic control units. The application installation device 100 installs an application A as a new install-target application.

First Embodiment

Figure 1:
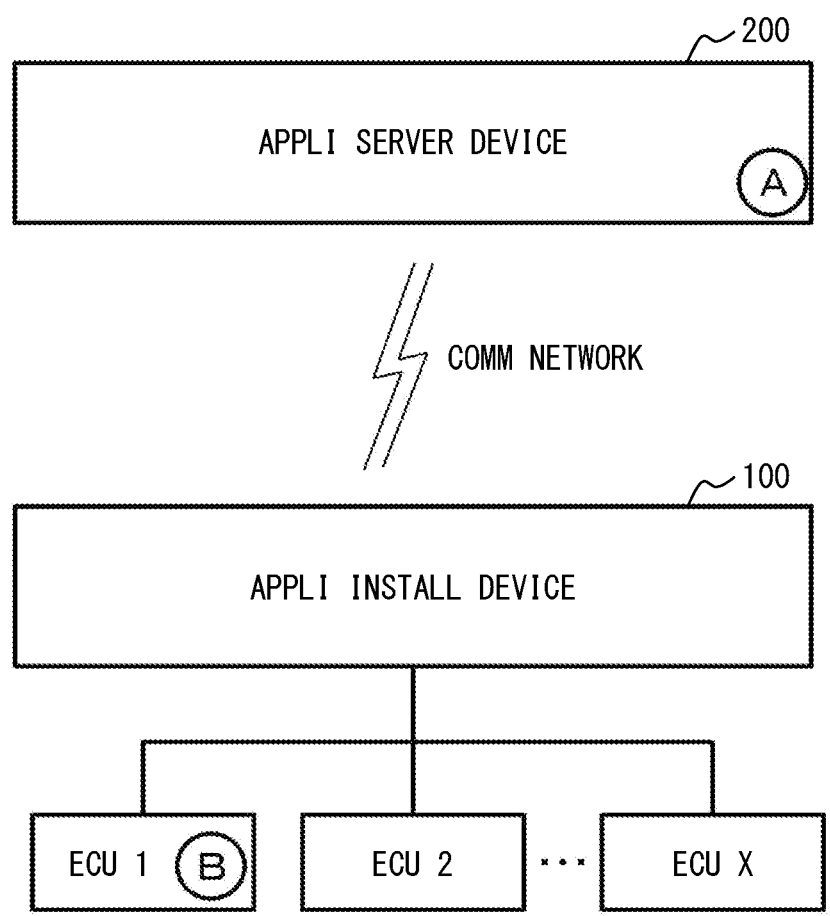
FIG. 1 is a block diagram illustrating configurations of an application installation device, an application server device, and a plurality of electronic control units according to a first embodiment of the present disclosure.

1. Configurations of Application Server Device, Application Installation Device, and Electronic Control Units First, the configurations of an application installation device, an application server device, and a plurality of electronic control units according to the present embodiment will be described with reference to FIG. 1. The application installation device 100 is connected to the application server device 200 via a communication network. The application installation device 100 is connected to X ECUs (ECU 1 to ECU X, corresponding to a plurality of "electronic control units").

Here, the application installation device may be a device that installs an application by itself in an electronic control unit, or a device that is interposed when the application server device installs an application in an electronic control unit. The position where the application installation device is disposed is unlimited, not only in the case where the application installation device is mounted in a vehicle, but also in the case where the application installation device is provided outside of a vehicle. An electronic control unit may be any device that can execute a calculation or a control based on an input command and output a result. The name thereof may be unlimited and may be an electronic control device, an information processing device, an information processing module, a microcomputer, or the like. Further, the electronic control unit may be a packaged semiconductor device, a configuration in which semiconductor devices are wired and connected on a wiring board, a semiconductor chip, a system board, a PC, or a portable information terminal.

The communication network is a wireless communication technology with which the application installation device 100 and the application server device 200 can communicate. The communication network may use a wireless communication method or a wireless communication system. The wireless communication method may be IEEE802.11 (WiFi), IEEE802.16 (WiMAX), W-CDMA (Wideband Code Division Multiple Access), HSPA (High Speed Packet Access), LTE (Long Term Evolution), or LTE-A (Long Term Evolution Advanced). The wireless communication system may be 4G or 5G. Further, the communication network is not limited to wireless, but may be wired.

The application installation device 100 and the ECUs 1 to X are mutually connected via an in-vehicle network provided in a vehicle. The in-vehicle network can use not only a communication method corresponding to an in-vehicle network such as a CAN (Controller Area Network) or a LIN (Local Interconnect Network), but also a communication method such as Ethernet (registered trademark) or Bluetooth (registered trademark). The in-vehicle network may be wired or wireless.

Figure 2:
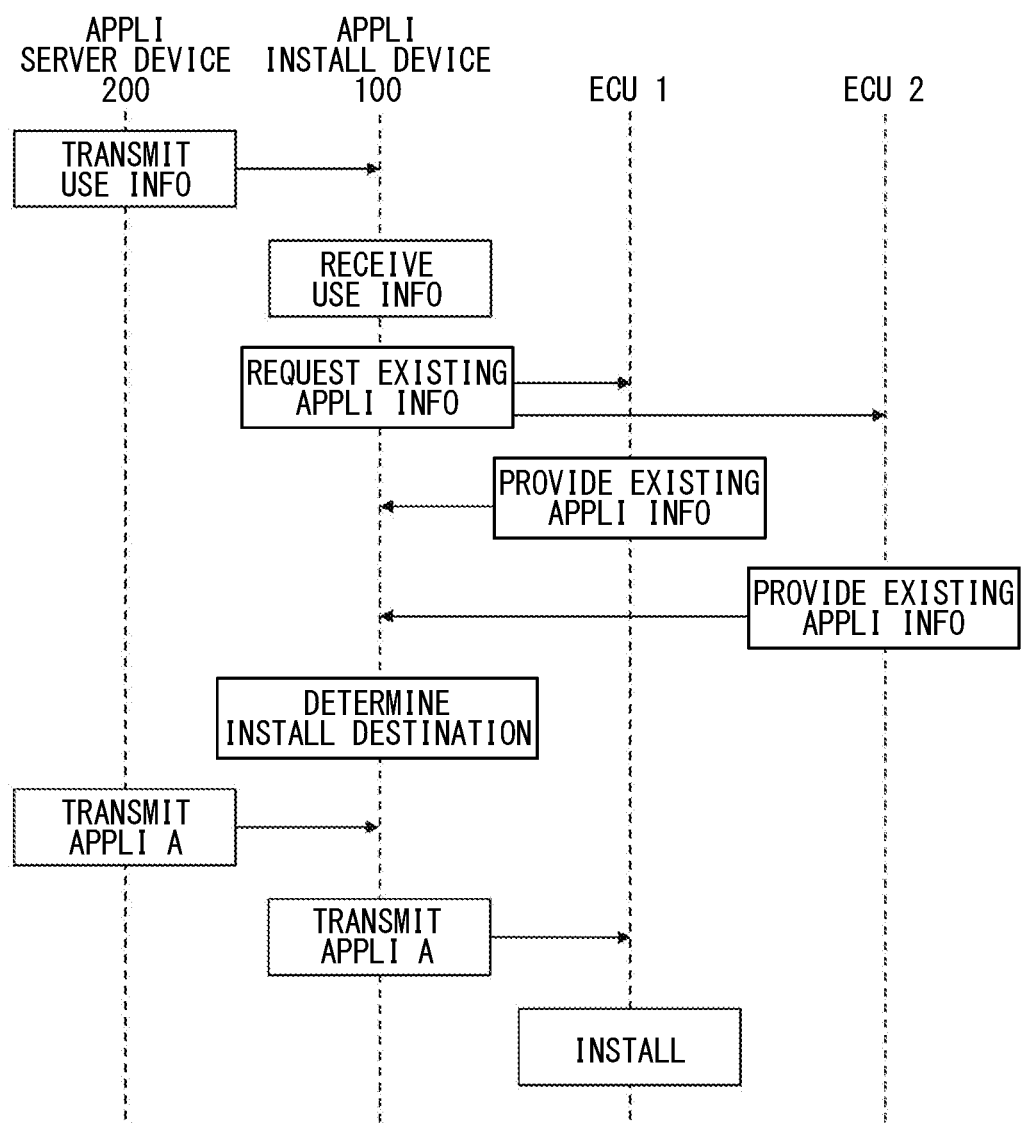
FIG. 2 is a sequence diagram illustrating functions of the application installation device, the application server device, and the plurality of electronic control units according to the first embodiment of the present disclosure.

2. Relationship Between Application Server Device, Application Installation Device, and Electronic Control Units Next, the relationship between the application installation device, the application server apparatus, and the plurality of electronic control unites according to the present embodiment will be described with reference to FIG. 2. The application server device 200 transmits the application usage information of the application A as an install-target application to the application installation device 100 based on the user's installation request. The application installation device 100 receives the application usage information of the application A. The application installation device 100 transmits a request for existing application information to the ECU 1 and the ECU 2. The ECU 1 and the ECU 2 provide individual existing application information to the application installation device 100. The application installation device 100 determines one of the ECU 1 and the ECU 2 as an installation destination of the application A. Here, the ECU 1 in which the application B has already been installed is determined as the installation destination. The application server device 200 transmits the application A to the application installation device 100. The application installation device 100 transmits the application A to the ECU 1 determined as the installation destination. The ECU 1 executes the installation of the application A.

3. Configuration of Application Installation Device

Next, the configuration of the application installation device according to the present embodiment will be described with reference to FIG. 3. The application installation device 100 includes a reception unit 102 (which may also be referred to as a receiver 101), a storage 102, a transmission unit 103 (which may also be referred to as a transmitter 103), a reception unit 104 (which may also be referred to as a receiver 104), and a central processing unit (CPU) 105.

The reception unit 101 receives (i) an application A (corresponding to a first application) to be installed and (ii) application usage information indicating an application B (corresponding to a second application) used by the application A, from the application server device 200.

Here, in a case where the electronic control unit is mounted on the vehicle, "installation" includes not only "installation" performed by a vehicle dealer or a user but also "installation" performed as being pre-installed at the time of factory shipment of the vehicle. Further, "application" means software in contradistinction to hardware, and includes middleware. It is also called a program. The term "use" includes not only the case where the application itself is used but also the case where only the result is used.

Figures 3, 4:
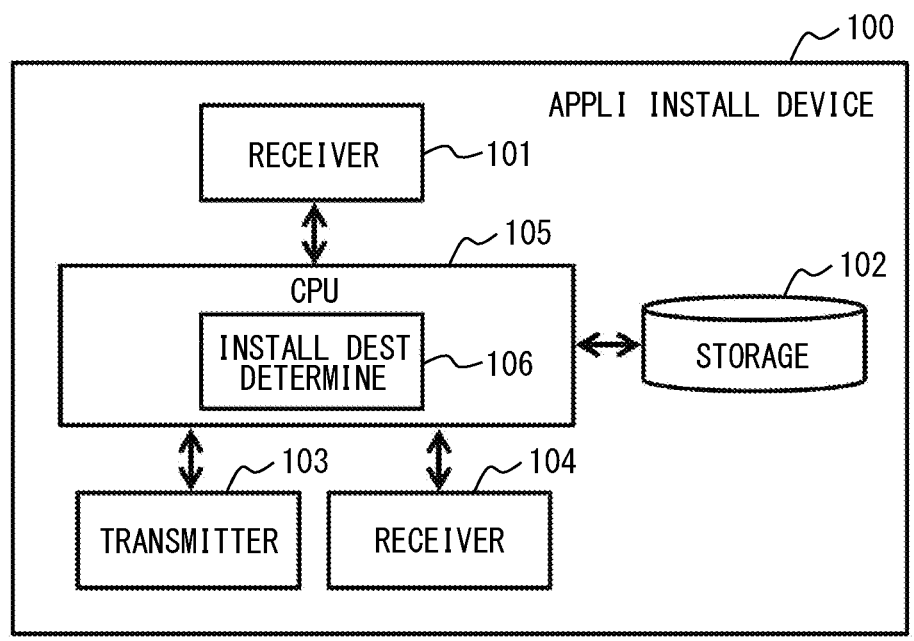
FIG. 3 is a block diagram illustrating a configuration of the application installation device according to the first embodiment of the present disclosure.
FIG. 4 is a diagram illustrating application usage information received by the application installation device according to the first embodiment of the present disclosure.

FIG. 4 shows application usage information received by the reception unit 101. The application usage information includes (i) information indicating an application to be installed and (ii) information indicating an application used by the application to be installed. FIG. 4 indicates that the application A uses the application B.

The following examples are given as a combination of the application A and the application B.

(Example 1)
Application A: Application for home delivery to the trunk of the vehicle
Application B: Application related to security, application related to vehicle locking (Example 2)
Application A: Application for monitoring dynamic state of the vehicle
Application B: Application for acquiring vehicle information using various sensors (Example 3)
Application A: Application for automatic parking
Application B: Application for acquiring vehicle information using various sensors (Example 4)
Application A: ADAS (Advanced Driver-Assistance Systems)
Application B: Application for acquiring vehicle information using various sensors The storage 102 stores existing application information indicating an existing application(s) installed in each of the ECUs 1 to X. The storage 102 is configured by a nonvolatile storage (not shown) such as an HDD or a flash memory, but may be configured by a volatile storage such as a RAM.

Figure 5:
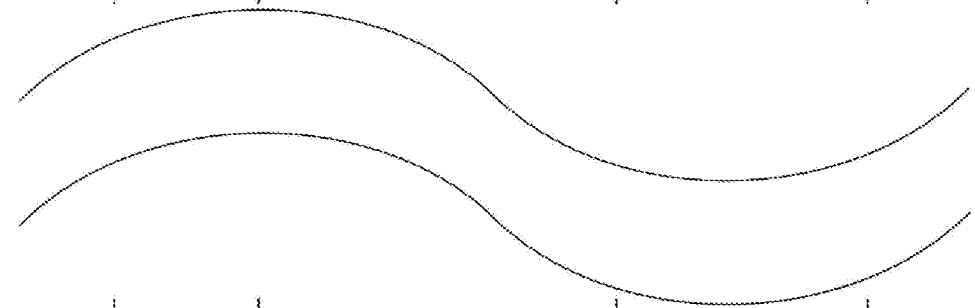
FIG. 5 is a diagram illustrating existing application information stored by the application installation device according to the first embodiment of the present disclosure.

FIG. 5 shows existing application information stored in the storage 102. The existing application information includes information indicating an existing application already installed in the ECUs 1 to X. From FIG. 5, the application B and the application C are installed in the ECU 1. An application D, an application E and an application F are installed in the ECU 2. An application H, an application I and an application J are installed in the ECU X.

The transmission unit 103 may transmit a request for providing the existing application information to each of the ECUs 1 to X (corresponding to "a plurality of electronic control units"). The reception unit 104 may acquire the existing application information by receiving the existing application information from each of the ECUs 1 to X. Further, each time an application is installed, the installed application may be stored as existing application information to be associated with the electronic control unit as the installation destination. Details will be described later.

The CPU 105, which may be also referred to as a processor, is connected to the reception unit 101, the storage 102, the transmission unit 103, and the reception unit 104 via communication links. The CPU 105 controls the reception unit 101, the storage 102, the transmission unit 103, and the reception unit 104 to perform various calculations. The CPU 105 implements the installation destination determination unit 106 along with memory storing instructions executed by the CPU 105.

The installation destination determination unit 106 determines whether, based on the existing application information, any ECU among the ECUs 1 to X includes an application B used by the application A to be installed as an existing application. In the present embodiment, the ECU 1 includes the application B as the existing application. The installation destination determination unit 106 thus determines the ECU 1 among the ECUs 1 to X in which the application A and the application B can be installed as an installation destination of the application A. In this case, an ECU determined as an installation destination may also be referred to as a determined electronic control unit.

The transmission unit 103 transmits the application A to the ECU 1 determined by the installation destination determination unit 106.

The storage 102 may download and store the application A before transmitting the application A to the ECU 1 determined by the installation destination determination unit 106. In addition, the storage 102 may upload and save applications already installed in the ECUs 1 to X, as described in the second and subsequent embodiments. The storage 102 is configured by a nonvolatile storage device (not shown) such as an HDD or a flash memory, but may be configured by a volatile storage device such as a RAM.

4. Operation of Application Installation Device

Figure 6:
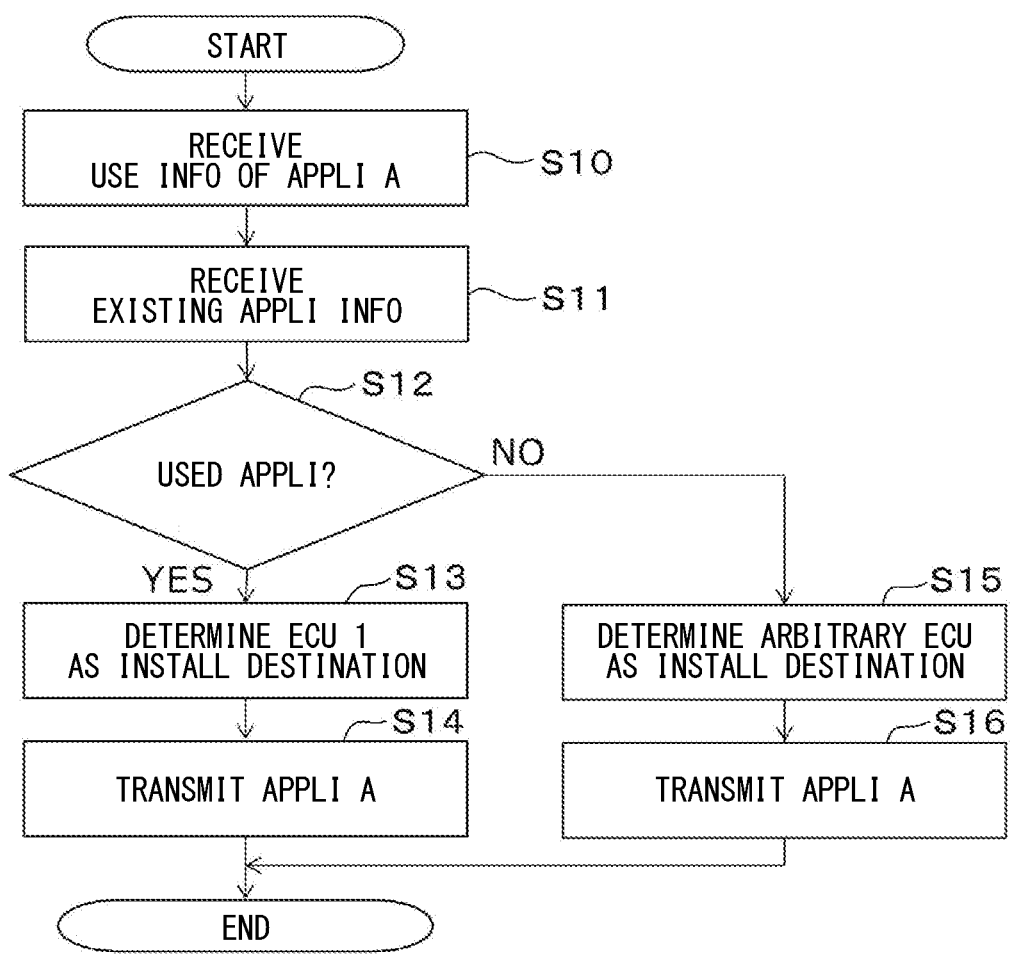
FIG. 6 is a flowchart for explaining an operation of the application installation device according to the first embodiment of the present disclosure.

Next, the operation of the application installation device 100 will be described with reference to FIG. 6. FIG. 6 shows not only an installation method but also a processing procedure of a program executed by the application installation device 100. In addition, the order of each step may be interchanged unless one step uses the result of another step. Hereinafter, the same applies to the flowchart of each embodiment.

In step S10, the reception unit 101 receives, from the application server device 200, application usage information indicating the application B that is used by the application A. In step S11, the reception unit 104 receives, from the plurality of electronic control units, existing application information indicating an application installed in each of the plurality of electronic control units. In step S12, based on the existing application information, it may be determined that the application B has been installed in any one of the plurality of electronic control units. In this case, in step S13, the installation destination determination unit 106 determines one of the plurality of electronic control units as the installation destination of the application A. Here, the ECU 1 in which the application B is installed is determined as the installation destination. In step S14, the transmission unit 103 transmits the application A to the ECU 1. In contrast, in step S12, based on the existing application information, it may be determined that the application B has not been installed in any one of the plurality of electronic control units. In this case, in step S15, the installation destination determination unit 106 determines an arbitrary electronic control unit as an installation destination of the application A. In step S16, the transmission unit 103 transmits the application A to the electronic control unit determined in S15.

5. Brief

As described above, according to the first embodiment, a plurality of applications having a use relationship are installed in the same ECU. Thus, communication between the ECUs can be made unnecessary when a plurality of applications provide the same service. This configuration can prevent an increase in communication load or communication delay between ECUs. In addition, the existing application information is received from each of the ECUs 1 to X. Even if the storage 102 does not hold the existing application information, the existing application information of a plurality of electronic control units can be thus obtained.

Modification Example of First Embodiment

The modification example of the first embodiment is another embodiment of the application installation device 100 in which information indicating that a new application is installed is stored at the time of installation as existing application information.

1. Configuration of Application Installation Device

First, the configuration of the application installation device according to the present embodiment will be described. The configuration of the application installation device 100 in the present embodiment is the same as that in FIG. 3. Only the function of the storage 102 is different.

The storage 102 stores information indicating that the application A (corresponding to a first application) has been installed in the ECU 1 determined by the installation destination determination unit 106 as existing application information.

2. Operation of Application Installation Device

Figure 7:
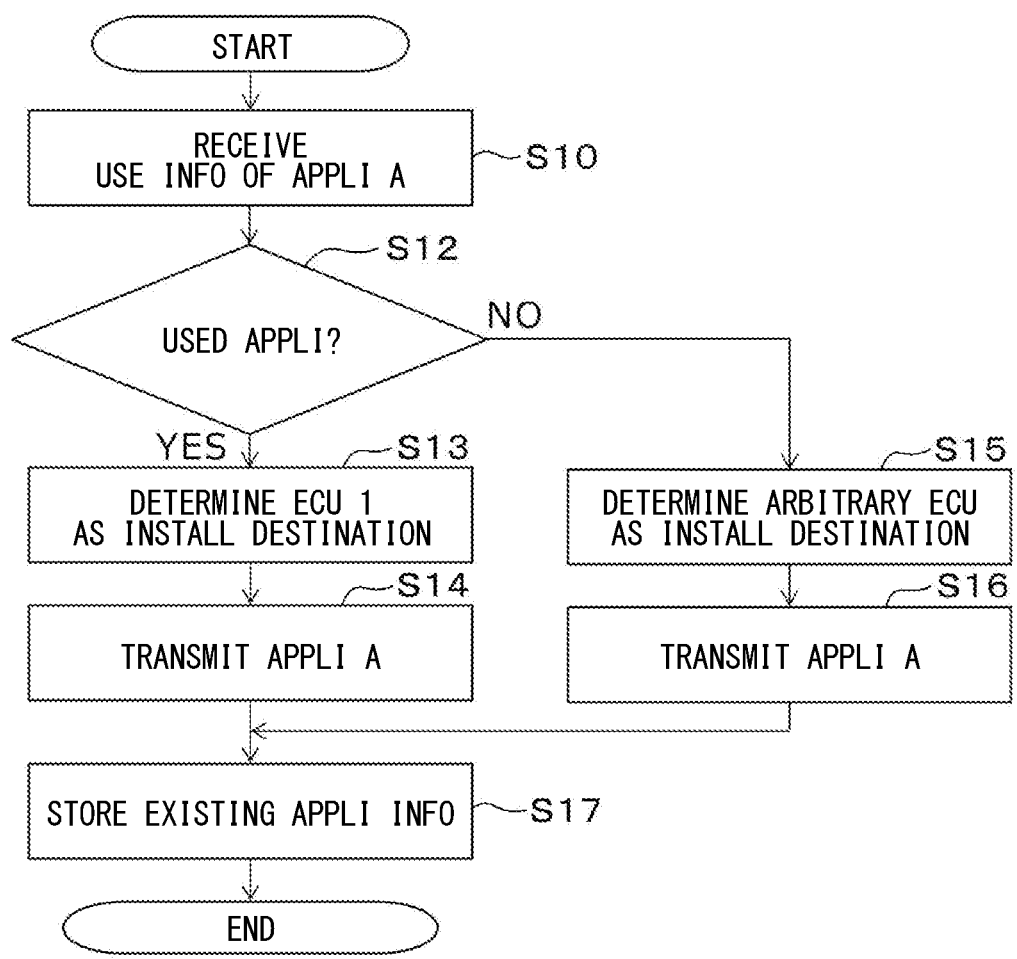
FIG. 7 is a flowchart for explaining an operation of the application installation device according to a modification example of the first embodiment of the present disclosure.

Next, the operation of the application installation device 100 will be described with reference to FIG. 7. Steps S10 and S12 to S16 are the same as the operation of the application installation device 100 of the first embodiment. On the other hand, the operation of step S11 of the first embodiment is not performed. In step S17, the storage 102 stores information indicating that the application A has been installed in the electronic control unit determined by the installation destination determination unit 106 as existing application information.

3. Brief

As described above, according to the modification example of the first embodiment, when a new application is installed, the existing application information is accumulated and held in the storage 102. Before installing a new application, there is thus no need to inquire each of the ECUs 1 to X about existing application information. As a result, traffic on the in-vehicle network can be reduced.

Second Embodiment

A second embodiment is another embodiment of the application installation device 100, and takes into consideration a free data capacity of the electronic control unit as the installation destination.

Figure 8:
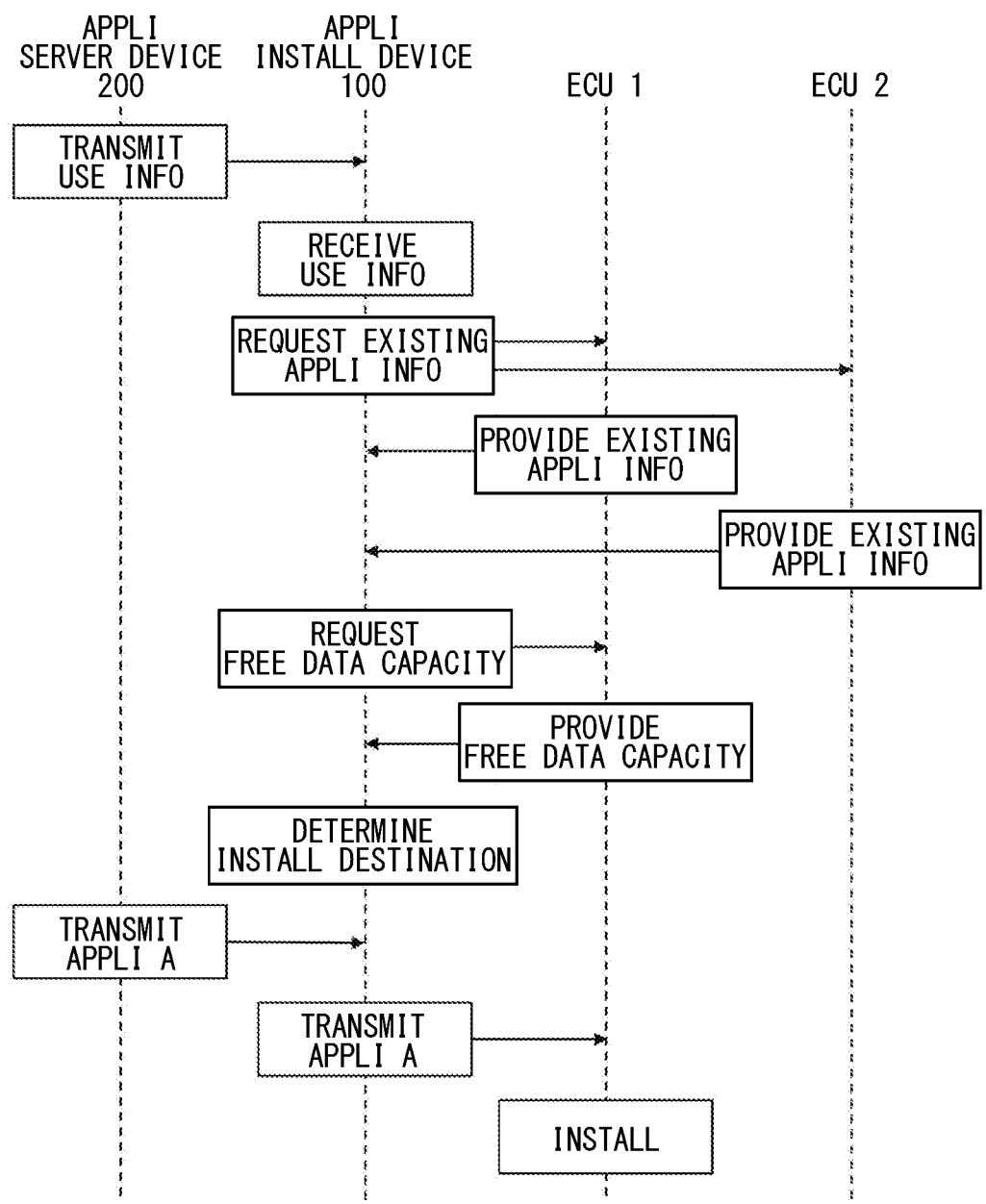
FIG. 8 is a sequence diagram illustrating functions of an application installation device, an application server device, and a plurality of electronic control units according to a second embodiment of the present disclosure.

1. Relationship Between Application Server Device, Application Installation Device, and Electronic Control Units First, the relationship between the application installation device, the application server device, and the plurality of electronic control units according to the present embodiment will be described with reference to FIG. 8. The application server device 200 transmits the application usage information of the application A to be installed to the application installation device 100 based on the user's installation request. The application installation device 100 receives the application usage information of the application A. The application installation device 100 transmits a request for existing application information to the ECU 1 and the ECU 2. The ECU 1 and the ECU 2 provide respective existing application information to the application installation device 100. The application installation device 100 transmits a request for free data capacity information to the ECU 1 in which the application B has already been installed. The ECU 1 provides the application installation device 100 with the free data capacity information. The application installation device 100 determines the ECU 1 as an installation destination in consideration of the free data capacity of the ECU 1. The application server device 200 transmits the application A to the application installation device 100. The application installation device 100 transmits the application A to the ECU 1 determined as the installation destination. The ECU 1 executes the installation of the application A.

2. Configuration of Application Installation Device

The application installation device 100 according to the present embodiment is the same as that in FIG. 3 except for the functions of the transmission unit 103, the reception unit 104, and the installation destination determination unit 106.

The application B (corresponding to a second application) may have been installed in the ECU 1 (corresponding to a first electronic control unit) as an existing application. In this case, the transmission unit 103 transmits a request for free data capacity information to the ECU 1. The reception unit 104 receives the free data capacity of the ECU 1 from the ECU 1.

The installation destination determination unit 106 determines whether the application A can be installed in the ECU 1 based on the size of the application A and the free data capacity of the ECU 1. As a simplest method, it may be determined whether the free data capacity of the ECU 1 is larger than the size of the application A. In the present embodiment, whether the application A can be installed is determined by taking into consideration the free data capacity consumed by executing the application A in addition to the size of the application and the free data capacity. Therefore, the installation destination determination unit 106 determines whether the free data capacity of the ECU 1 is sufficiently larger than the size of the application A.

It is assumed that patterns 1 to 3 are combinations of the size of the application A and the free data capacity of the ECU 1.

Pattern 1: Application A with 100 MB, ECU 1 with free data capacity 500 MB
Pattern 2: Application A with 100 MB, ECU 1 with free data capacity 105 MB
Pattern 3: Application A with 100 MB, ECU 1 with free data capacity 80 MB As an example of determining whether the free data capacity of the ECU 1 is sufficiently larger than the size of the application A, a determination may be made based on how much free data capacity is secured with respect to the total capacity of the ECU 1. For example, when the total capacity of the ECU 1 is 1 GB, the condition can be that the free data capacity after the installation of the application A is 300 MB, which is 30% of the total capacity. In the case of pattern 1, the free data capacity after the application A is installed is 400 MB. On the other hand, in the case of the pattern 2, the free data capacity after the installation of the application A is 5 MB. In the case of pattern 3, there is no free data capacity for installing application A. Therefore, it is determined that the free data capacity of the ECU 1 is sufficiently larger than the size of the application A only in the case of the pattern 1 among the patterns 1 to 3.

Then, in the case of the pattern 1, the installation destination determination unit 106 determines the ECU 1 as the installation destination of the application A.

3. Operation of Application Installation Device

Next, the operation of the application installation device 100 will be described with reference to FIG. 9.

In step S20, the reception unit 101 receives, from the application server device 200, application usage information indicating the application B used by the application A. In step S21, it may be determined that the application B has been installed in the ECU 1 based on the existing application information indicating the application already installed in each of the plurality of electronic control units. In this case, in step S22, the reception unit 104 receives the free data capacity of the ECU 1 from the ECU 1. In step S23, the installation destination determination unit 106 determines whether the application A can be installed in the ECU 1 based on the size of the application A and the free data capacity of the ECU 1. If the application A can be installed in the ECU 1, the installation destination determination unit 106 determines the ECU 1 as the installation destination of the application A in step S24. In step S25, the transmission unit 103 transmits the application A to the ECU 1. In contrast, the application B may not be installed in any of the multiple electronic control units and the application A may not be installed in ECU 1. In this case, in step S26, the installation destination determination unit 106 determines an arbitrary electronic control unit as the installation destination of the application. In step S27, the transmission unit 103 transmits the application A to the electronic control unit determined in S26.

Note that, as in the first embodiment, the transmission unit 103 may transmit a request for providing existing application information to each of the plurality of electronic control units, while the reception unit 104 may acquire the existing application information by receiving the existing application information from each of the plurality of electronic control units. Further, as in the modification example of the first embodiment, each time an application is installed, the installed application may be stored as existing application information to be associated with the electronic control unit as the installation destination. The same applies to the following embodiments.

3. Brief

As described above, the second embodiment can prevent a situation in which an application cannot be installed in the electronic control unit due to a problem of data capacity.

Third Embodiment

A third embodiment is another embodiment of the application installation device 100, and includes a process of deleting unnecessary applications and securing free data capacity.

Figure 10:
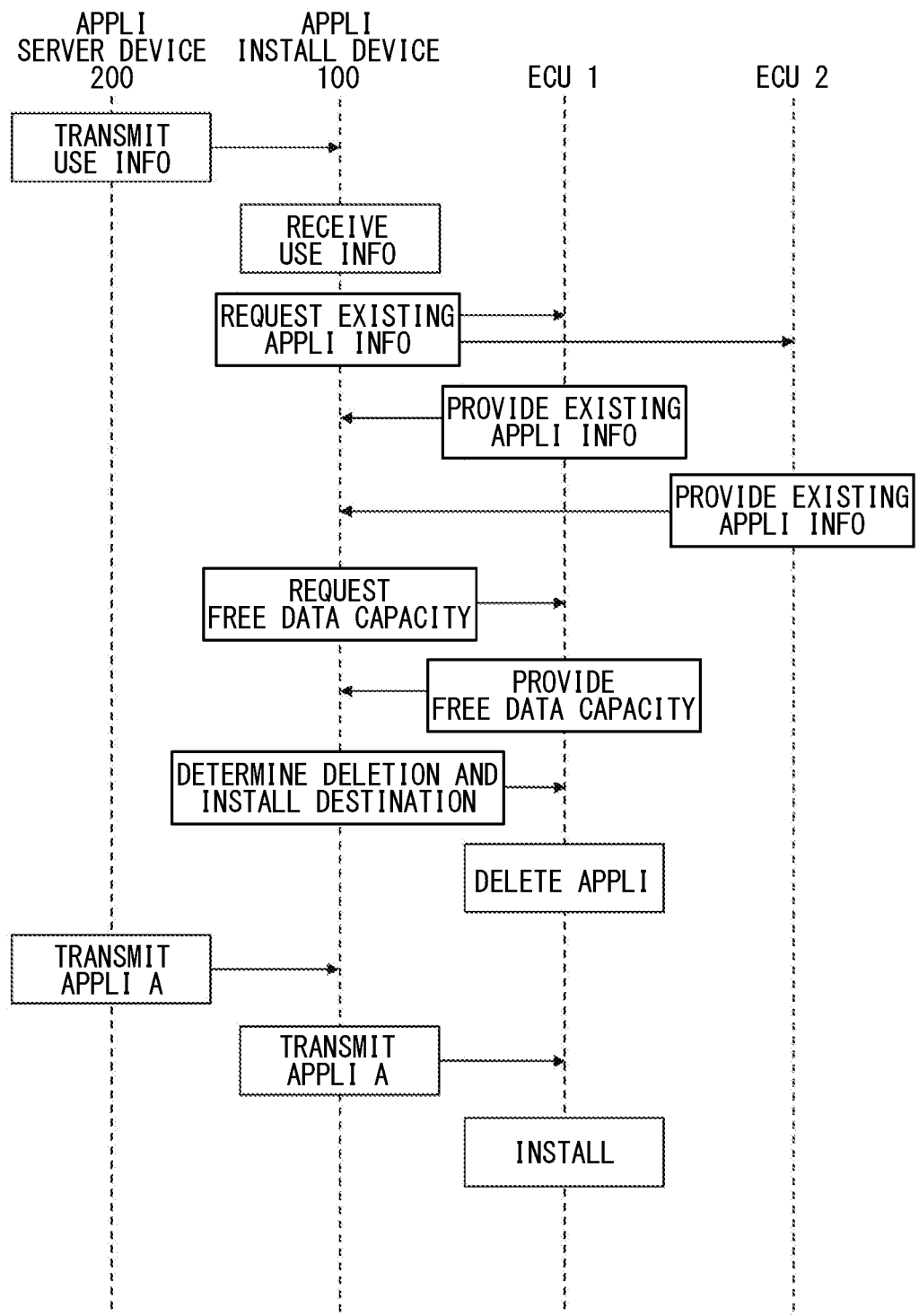
FIG. 10 is a sequence diagram illustrating functions of an application installation device, an application server device, and a plurality of electronic control units according to a third embodiment of the present disclosure.

1. Relationship Between Application Server Device, Application Installation Device, and Electronic Control Units First, the relationship between the application installation device, the application server device, and the plurality of electronic control units according to the present embodiment will be described with reference to FIG. 10. The application server device 200 transmits the application usage information of the application A to be installed to the application installation device 100 based on the user's installation request. The application installation device 100 receives the application usage information of the application A. The application installation device 100 transmits a request for existing application information to the ECU 1 and the ECU 2. The ECU 1 and the ECU 2 provide respective existing application information to the application installation device 100. The application installation device 100 transmits a request for free data capacity information to the ECU 1 in which the application B is installed. The ECU 1 provides the application installation device 100 with free data capacity information. The application installation device 100 determines that an application that is not frequently used by the ECU 1 is to be deleted in consideration of the free data capacity of the ECU 1, determines the ECU 1 as an installation destination, and notifies the ECU 1. The ECU 1 deletes the infrequently used application with the consent of the user or the like. The application server device 200 transmits the application A to the application installation device 100. The application installation device 100 transmits the application A to the ECU 1 determined as the installation destination. The ECU 1 executes the installation of the application A.

2. Configuration of Application Server Device

The application installation device 100 in the present embodiment is the same as that in FIG. 3, but different in only the function of the installation destination determination unit 106 from the first embodiment.

It may be determined that the application A cannot be installed in the ECU 1 based on the size of the application A and the free data capacity of the ECU 1 (i.e., the patterns 2 and 3 of the second embodiment). In this case, the installation destination determination unit 106 further determines deleting "infrequently used" applications from the applications installed in the ECU 1.

Here, "infrequently used" includes not only a case where the number of uses is small, but also a case where a predetermined period has elapsed since the last use.

Based on the existing application information shown in FIG. 5, the application C is installed in the ECU 1 in addition to the application B. Therefore, under the case of the pattern 3 of the second embodiment (i.e., the size of the application A is 100 MB and the free data capacity of the ECU 1 is 80 MB), patterns 4 to 6 which are combinations of the use frequency and the size of the application C are assumed.

Premise common to patterns 4 to 6: Application A with the size of 100 MB, ECU 1 with the free data capacity of 80 MB Pattern 4: Application C used infrequently with the size of 400 MB Pattern 5: Application C used frequently with the size of 400 MB Pattern 6: Application C used infrequently with the size of 25 MB Whether the usage frequency is low can be determined by setting a threshold value for the number of times of use of the existing application or by setting a threshold value for the number of days from the last use date to the present. In this case, the number of times of use of the existing application and the last use date and time are acquired as existing application information.

The determination as to whether the application can be installed uses the same criteria as in the second embodiment. In the case of pattern 4, the free data capacity after the application C is deleted and the application A is installed is 380 MB, which exceeds 30% of the total capacity. On the other hand, in the case of the pattern 6, there is no free data capacity for installing the application A after deleting the application C. Therefore, only in the case of the pattern 4, it is determined that the size of the application C is sufficiently larger than the difference between the size of the application A and the free data capacity in the ECU 1.

Then, the installation destination determination unit 106 determines deleting the application C from the ECU 1 (corresponding to a first electronic control unit), and determines the ECU 1 as the installation destination of the application A.

2. Operation of Application Installation Device

Figure 11:
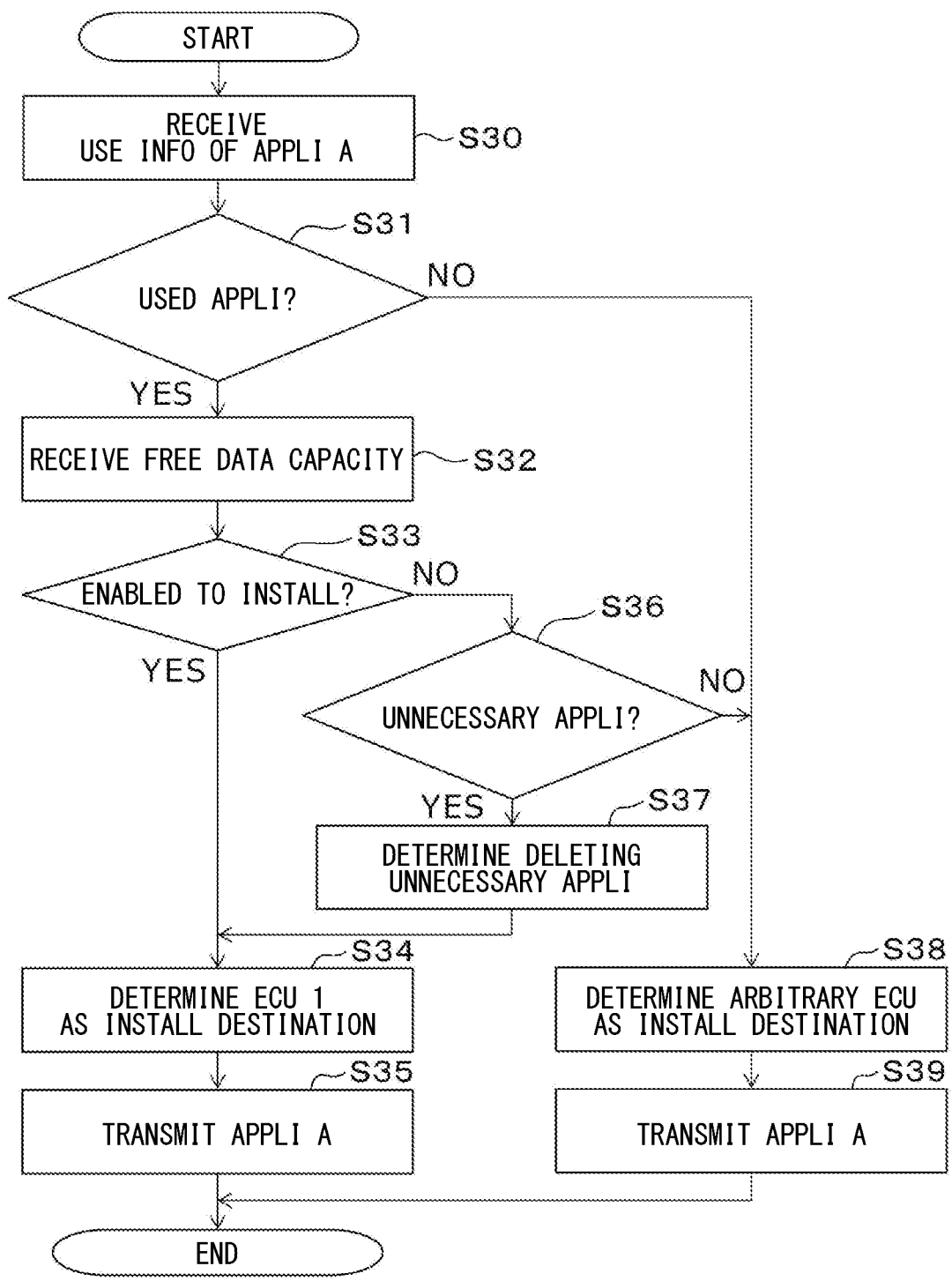
FIG. 11 is a flowchart illustrating an operation of the application installation device according to the third embodiment of the present disclosure.

Next, the operation of the application installation device 100 will be described with reference to FIG. 11. Steps S30 to S35, S38 and S39 are the same as steps S20 to S27 in FIG. 9 and will not be described. If the application A cannot be installed in the ECU 1 in step S33, in step S36, the installation destination determination unit 106 determines whether there is an application C that is not frequently used in the ECU 1 based on the existing application information. If the application C exists in the ECU 1, the installation destination determination unit 106 determines deleting the application C from the ECU 1 in step S37. Thereafter, the operations of step S34 and step S35 are performed. If there is no unnecessary application in the ECU 1, the installation destination determination unit 106 determines an arbitrary electronic control unit as an installation destination of the application A in step S38.

3. Brief

As described above, the third embodiment can prevent a situation in which an application cannot be installed in the electronic control unit due to a problem of data capacity. In addition, by deleting unnecessary applications, the memory of the electronic control unit, which is a finite resource, can be effectively used.

Fourth Embodiment

A fourth embodiment is another embodiment of the application installation device 100 and includes a process of moving an existing application from an electronic control unit on which the existing application is installed.

Figure 12:
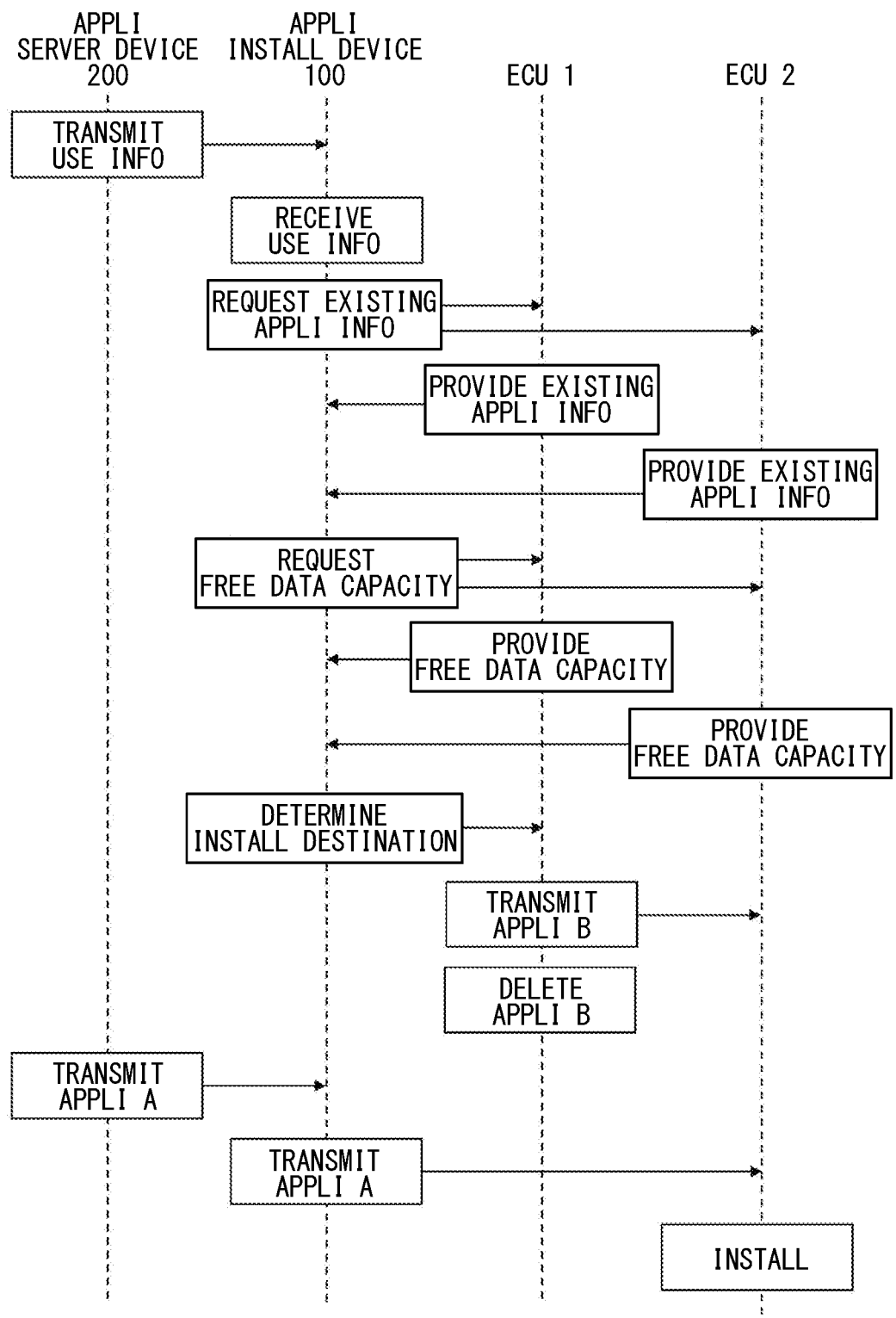
FIG. 12 is a sequence diagram illustrating functions of an application installation device, an application server device, and a plurality of electronic control units according to a fourth embodiment of the present disclosure.

1. Relationship Between Application Server Device, Application Installation Device, and Electronic Control Units First, the relationship between the application installation device, the application server device, and the plurality of electronic control units according to the present embodiment will be described with reference to FIG. 12. The application server device 200 transmits the application usage information of the application A to be installed to the application installation device 100 based on the user's installation request. The application installation device 100 receives the application usage information of the application A. The application installation device 100 transmits a request for existing application information to the ECU 1 and the ECU 2. The ECU 1 and the ECU 2 provide respective existing application information to the application installation device 100. The application installation device 100 transmits a request for free data capacity information to the ECU 1 and the ECU 2. The ECU 1 and the ECU 2 provide the application installation device 100 with respective free data capacity information. The application installation device 100 considers the free data capacity of the ECU 2 in addition to the free data capacity of the ECU 1, to thereby determine that the installation destination of application B, which is an existing application used by application A, is changed from ECU 1 to ECU 2. The application installation device 100 determines the ECU 2 as the installation destination of the application A and notifies the ECU 2. The ECU 1 transmits the application B to the ECU 2 and deletes the application B. The application server device 200 transmits the application A to the application installation device 100. The application installation device 100 transmits the application A to the ECU 2. The ECU 2 installs the application A and the application B.

Note that the ECU 1 may transmit the application B to the application installation device 100 instead of transmitting the application B to the ECU 2. In this case, the application installation device 100 transmits the application B uploaded from the ECU 1 to the ECU 2 in addition to the application A.

Further, the order of transmitting the application B, deleting the application B, installing the application B, transmitting the application A, and installing the application A may be changed as needed, except for deleting application B after transmitting the application B. The application A and the application B may be installed at different timings or at the same timing.

2. Configuration of Application Installation Device

The application installation device 100 according to the present embodiment is the same as that in FIG. 3 except for the function of the installation determination unit 106.

There is a case where the application A (corresponding to a first application) cannot be installed in the ECU 1 (corresponding to a first electronic control unit) based on the size of the application A and the free data capacity of the ECU 1, i.e., the pattern 2 and pattern 3 in the second embodiment. In such a case, the transmission unit 103 transmits a request for free data capacity information to the ECU 2. The reception unit 104 receives the free data capacity of the ECU 2 from the ECU 2 (corresponding to a second electronic control unit).

The installation destination determination unit 106 further determines whether the application A and the application B can be installed in the ECU 2 based on the size of the application A, the size of the application B (corresponding to a second application), and the free data capacity of the ECU 2. The determination method may be the same method as in the second embodiment.

When the application A and the application B can be installed in the ECU 2, the installation destination determination unit 106 determines deleting the application B from the ECU 1, and determines the ECU 2 as the installation destination of the application A. The transmission unit 103 transmits a transmission request instructing the ECU 1 to transmit the application B to the ECU 2, and transmits the application A to the ECU 2.

After transmitting the application B from the ECU 1 to the transmission unit 103 and uploading the application B to the storage 102, the installation destination determination unit 106 may determine deleting the application B from the ECU 1, and determine the ECU 2 as an installation destination of the application A and the application B. In this case, the transmission unit 103 transmits the application B to the ECU 2 in addition to the application A.

2. Operation of Application Installation Device

Figure 13:
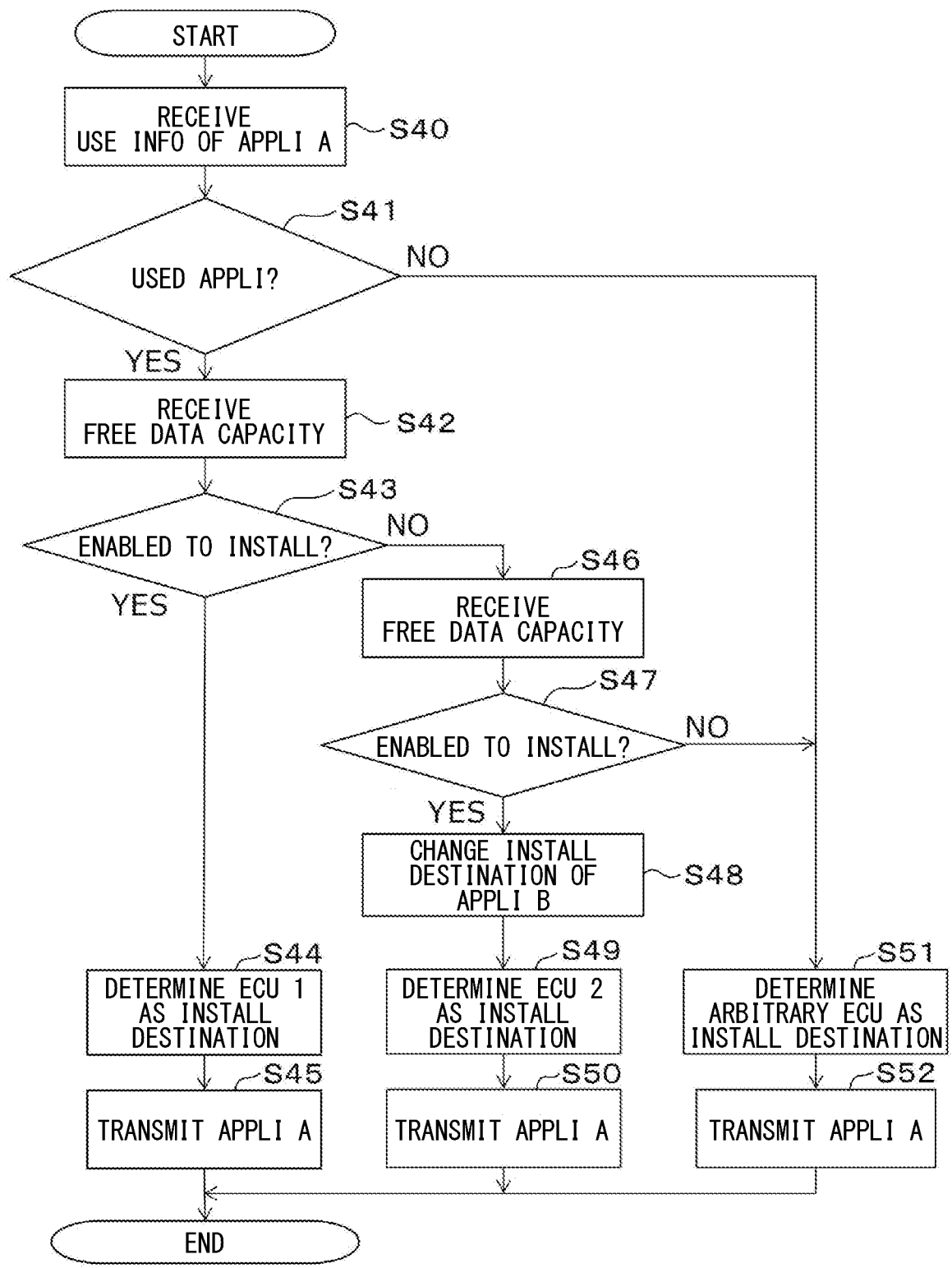
FIG. 13 is a flowchart illustrating an operation of the application installation device according to the fourth embodiment of the present disclosure.

Next, the operation of the application installation device 100 will be described with reference to FIG. 13.

Figure 9:
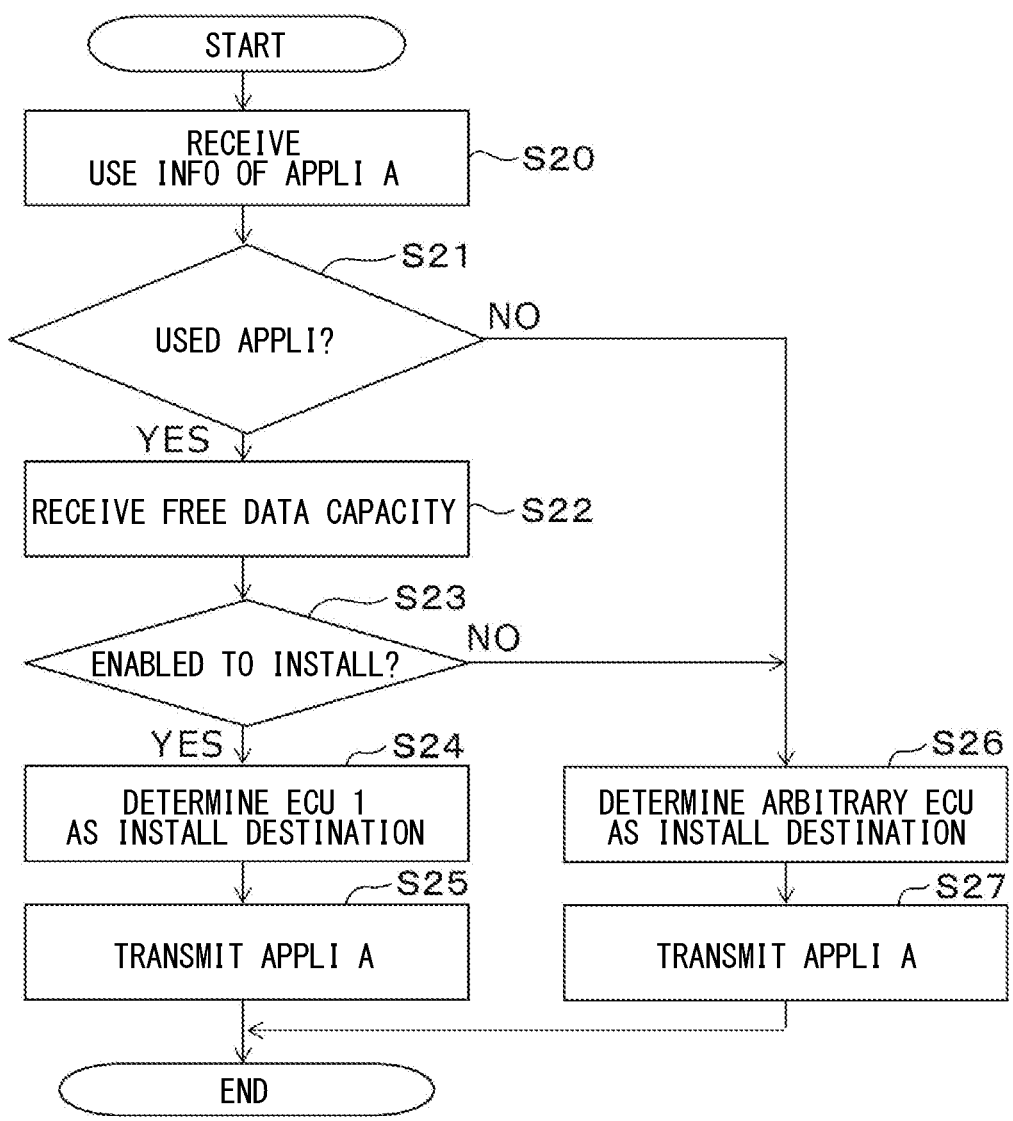
FIG. 9 is a flowchart illustrating an operation of the application installation device according to the second embodiment of the present disclosure.

Steps S40 to S45, S51, and S52 are the same as S20 to S27 in FIG. 9; thus, the explanation is omitted. In step S43, the application A may not be installed in the ECU 1. In this case, in step S46, the reception unit 104 receives the free data capacity of the ECU 2 different from the ECU 1 included in the plurality of electronic control units. In step S47, the installation destination determination unit 106 determines whether the application A and the application B can be installed in the ECU 2 based on the size of the application A, the size of the application B, and the free data capacity of the ECU 2. The application A and the application B may be installed in the ECU 2. In this case, in step S48, the installation destination determination unit 106 determines changing the installation destination of the application B from the ECU 1 to the ECU 2. In step S49, the installation destination determination unit 106 determines the ECU 2 as the installation destination of the application A. In step S50, the transmission unit 103 transmits the application A to the ECU 2. The application A and the application B may not be installed in the ECU 2. In this case, the installation destination determination unit 106 determines an arbitrary electronic control unit as the installation destination of the application A in step S51. In step S51, the installation destination determination unit 106 determines an arbitrary electronic control unit as an installation destination of the application A.

In step S48, the installation destination determination unit 106 determines deleting the application B from the ECU 1 after transmitting the application B from the ECU 1 to the ECU 2.

Alternatively, in step S48, the installation destination determination unit 106 may determine deleting the application B from the ECU 1 after uploading the application B from the ECU 1 to the storage 102. In this case, in step S50, the transmission unit 103 transmits the application B to the ECU 2 in addition to the application A.

3. Brief

As described above, the fourth embodiment can prevent a situation in which an application cannot be installed in the electronic control unit due to a problem of data capacity. In addition, a plurality of applications are arranged based on the use relationship; thus, the memory of the electronic control unit, which is a finite resource, can be efficiently used.

(Overview)

The features of the application installation device according to each embodiment of the present disclosure have been described above.

The term used in each embodiment is an example, and may be replaced with a term having the same meaning or a term having the same function.

The block diagram used in the description of the embodiments is obtained by classifying and organizing the configuration of the device and the like for each function. Functional blocks are each referred to as a unit, such as the reception unit 101, transmission unit 103, reception unit 104, installation destination determination unit 106 in FIG. 3; further, such a unit may also be referred to as a module. An individual one of such functional blocks may be realized by hardware (i.e., hardware circuitry) or any combination of hardware (such as CPU, memory) and software (i.e., program). In addition, since the block diagram shows functions, such a block diagram may be understood as a disclosure of a method or a program for realizing the method.

The order of the functional blocks that can be grasped as the processes, flows, and methods described in the embodiments may be changed as long as there is no restriction that one step uses the result of another step.

The terms "first" and "second" used in each of the embodiments and the present disclosure are used to distinguish two or more configurations and methods of the same type, and do not limit the order or superiority.

An individual one of the application installation device 100 and the application server device 200 providing the functions or the units described in the above embodiments may be implemented by one or more special-purpose computers. An individual one of such computers may be created (i) by configuring a memory and a processor programmed to execute one or more particular functions embodied in computer programs, or (ii) by configuring a processor provided by one or more special purpose hardware logic circuits, or (iii) by configuring a combination of (a) a memory and a processor programmed to execute one or more particular functions embodied in computer programs and (b) a processor provided by one or more hardware logic circuits.

Programs may be stored in special-purpose or general-purpose hardware storage media (external storage devices such as hard disk, USB memory, CD/BD, or internal storages such as RAM, ROM). Such programs may also be provided to special-purpose or general-purpose hardware via a storage medium or via a communication line from a server without using a storage medium. Consequently, when the program is upgraded, the latest function is thus always provided.

INDUSTRIAL APPLICABILITY

The application installation device and the electronic control units of the present disclosure have been mainly described for vehicles. There is no need to be limited thereto. That is, the application installation device and the electronic control units of the present disclosure may be applied to any moving object such as motorcycle, motorized bicycle, railway, ship, aircraft, and the like.

For reference to further explain features of the present disclosure, the description is added as follows.

In recent years, the advancement of electronic control technology has been improved the performance of various functions and devices constituting a vehicle including an engine. The functions and devices to be controlled electronically include an airbag, a transmission, a lane keeping system, and an inter-vehicle distance control system. An electronic control unit (ECU: Electronic Control Unit) performs these electronic controls. Nowadays some vehicle has more than 100 ECUs, which play the brain of various advanced technologies. Various functions are newly installed in the ECU, so that the functions of the ECU can be further expanded.

There is known an information processing device that executes installation of a program. In particular, such an information processing device performs the followings: calculating used amounts in capacity of several storage media; determining whether a installation target program can be installed by comparing the calculated used amount with the free data capacity of each recording medium; and executing the program installation on a storage medium determined to be installable among a plurality of storage media.

It has been considered that software of ECU be implemented by a service-oriented architecture, which implements computer software functions in units of independent "services" and combines them to create a system. The present inventor has found the following issues. That is, there may be a case that a new application be installed in another ECU, which is different from the ECU in which a related application used by the new application has been already installed. In other words, a plurality of applications having a use relationship (i.e., providing the same service) may be installed across a plurality of different ECUs. In this case, the plurality of different ECUs need to communicate with each other to thereby increase the communication load between the ECUs.

It is thus desired to provide an application installation device and an application installation method that can prevent an increase in communication delay and communication load between ECUs.

Aspects of the present disclosure described herein are set forth in the following clauses.

According to a first aspect of the present disclosure, an application installation device may be configured to be connected with a plurality of electronic control units and be provided to include a receiver, a storage, an application installation destination determination unit, and a transmitter.

The receiver may be configured to receive a first application to be installed and application usage information indicating a second application used by the first application. The storage may be configured to store existing application information indicating an existing application installed in each of the plurality of electronic control units. The installation destination determination unit may be configured to determine, in response to the second application being included as the existing application based on the existing application information, a determined electronic control unit as an installation destination of the first application, the determined electronic control unit being an electronic control unit in which the first application and the second application are enabled to be installed among the plurality of electronic control units. The transmitter may be configured to transmit the first application to the determined electronic control unit determined by the installation destination determination unit.

In the above, the installation destination determination unit may be implemented by a CPU (i.e., processor) along with memory storing instructions executed by the CPU.

Furthermore, according to a second aspect of the present disclosure, a computer-implemented application installation method executed by a processor may be provided for the application installation device according to the first aspect.

Yet furthermore, according to a third aspect of the present disclosure, a non-transitory computer readable storage medium may be provided as comprising instructions for execution by a computer, the instructions including the application installation method according to the second aspect, the method being computer-implemented.

According to each of the above aspects, the communication delay and the communication load between ECUs can be prevented from increasing by installing, in the same ECU, several applications which have a use relationship.

What is claimed is:

1. An application installation device connected to a plurality of electronic control units, comprising:
a receiver configured to receive (i) a first application to be installed and (ii) application usage information indicating a second application used by the first application;
a storage configured to store existing application information indicating an existing application installed in each of the plurality of electronic control units;
an installation destination determination unit configured to determine, in response to the second application being included as the existing application based on the existing application information, a determined electronic control unit as an installation destination of the first application, the determined electronic control unit being an electronic control unit in which the first application and the second application are enabled to be installed among the plurality of electronic control units; and
a transmitter configured to transmit the first application to the determined electronic control unit determined by the installation destination determination unit.

2. The application installation device according to claim 1, wherein:
the transmitter is configured to transmit a provision request of the existing application information to each of the plurality of electronic control units; and
the receiver is configured to receive the existing application information from each of the plurality of electronic control units.

3. The application installation device according to claim 1, wherein
the storage is configured to store, as the existing application information, information indicating that the first application has been installed in the determined electronic control unit determined by the installation destination determination unit.

4. The application installation device according to claim 1, wherein:
in response to that the second application is installed in a first electronic control unit included in the plurality of electronic control units as the existing application based on the existing application information, the receiver is configured to receive a first free data capacity in the first electronic control unit;
the installation destination determination unit is configured to determine whether the first application is enabled to be installed in the first electronic control unit based on (i) the first free data capacity and (ii) a size of the first application; and
in response to the first application being enabled to be installed in the first electronic control unit, the installation destination determination unit is configured to determine the first electronic control unit as the installation destination of the first application.

5. The application installation device according to claim 4, wherein
in response to the first application being disabled to be installed in the first electronic control unit, the installation destination determination unit is configured to determine deleting an application that is used less frequently from existing applications in the first electronic control unit.

6. The application installation device according to claim 4, wherein:
in response to the first application being disabled to be installed in the first electronic control unit, the receiver is configured to further receive a second free data capacity in a second electronic control unit different from the first electronic control unit included in the plurality of electronic control units;
the installation destination determination unit is configured to determine whether the first application and the second application are enabled to be installed in the second electronic control unit based on a size of the first application, a size of the second application, and the second free data capacity;
in response to that the first application and the second application are enabled to be installed in the second electronic control unit, the installation destination determination unit is configured to determine deleting the second application from the first electronic control unit, and determine the second electronic control unit as the installation destination of the first application and the second application; and
the transmitter is configured to transmit a transmission request instructing the first electronic control unit to transmit the second application to the second electronic control unit, and transmit the first application to the second electronic control unit.

7. The application installation device according to claim 4, wherein:
in response to the first application is disabled to be installed in the first electronic control unit, the receiver is configured to further receive a second free data capacity in a second electronic control unit different from the first electronic control unit included in the plurality of electronic control units;
the installation destination determination unit is configured to determine whether the first application and the second application are enabled to be installed in the second electronic control unit based on a size of the first application, a size of the second application, and the second free data capacity;
in response to that the first application and the second application are enabled to be installed in the second electronic control unit, the installation destination determination unit is configured to determine deleting the second application from the first electronic control unit, and determine the second electronic control unit as the installation destination of the first application and the second application; and
the transmitter is configured to transmit a transmission request instructing the first control unit to transmit the second application to the application installation device, and transmit the first application and the second application to the second electronic control unit.

8. A computer-implemented application installation method executed by a processor for an application installation device configured to be connected to a plurality of electronic control units, comprising:
receiving (i) a first application to be installed and (ii) application usage information indicating a second application used by the first application;
determining, in response to the second application being included as an existing application based on existing application information, a determined electronic control unit as an installation destination of the first application, the determined electronic control unit being an electronic control unit in which the first application and the second application are enabled to be installed among the plurality of electronic control units; and
transmitting the first application to the determined electronic control unit.

9. A non-transitory computer readable storage medium comprising instructions for execution by a computer, the instructions including the application installation method according to claim 8, the method being computer-implemented.

10. An application installation device connected to a plurality of electronic control units, comprising:
- a receiver configured to receive (i) a first application to be installed and (ii) application usage information indicating a second application used by the first application;
- a storage configured to store existing application information indicating an existing application installed in each of the plurality of electronic control units;
- a processor communicably connected with the each of the receiver and the storage, the processor being configured to determine, in response to the second application being included as the existing application based on the existing application information, a determined electronic control unit as an installation destination of the first application, the determined electronic control unit being an electronic control unit in which the first application and the second application are enabled to be installed among the plurality of electronic control units; and
- a transmitter communicably connected with the processor, the transmitter being configured to transmit the first application to the determined electronic control unit determined by the processor.

\* \* \* \* \*